(12) United States Patent
Oliver

(10) Patent No.: US 7,636,508 B2
(45) Date of Patent: Dec. 22, 2009

(54) DISPLAY DEVICE

(76) Inventor: David Noel Oliver, 116/120 High Street, Hampton, Middlesex. TW12 2ST. (GB)

( * ) Notice: Subject to any disclaimer, the term of this patent is extended or adjusted under 35 U.S.C. 154(b) by 0 days.

(21) Appl. No.: 12/283,463

(22) Filed: Sep. 11, 2008

(65) Prior Publication Data

US 2009/0139123 A1 Jun. 4, 2009

Related U.S. Application Data

(63) Continuation of application No. 10/525,935, filed on Oct. 25, 2005, now abandoned.

(30) Foreign Application Priority Data

Aug. 29, 2002 (GB) ................................ 0220005.3

(51) Int. Cl.
*G02B 6/00* (2006.01)
*G09F 13/18* (2006.01)
*G09F 13/00* (2006.01)
*F21V 7/04* (2006.01)

(52) U.S. Cl. ............................ 385/147; 40/546; 40/547; 362/551; 362/559; 362/608; 362/610; 362/615

(58) Field of Classification Search ................. 385/147; 40/546, 547; 362/551, 559, 608, 610, 615
See application file for complete search history.

(56) References Cited

U.S. PATENT DOCUMENTS

| 5,565,892 A | * | 10/1996 | Feustle | 345/173 |
| 6,330,111 B1 | * | 12/2001 | Myers | 359/599 |
| 7,263,268 B2 | * | 8/2007 | Inditsky | 385/146 |
| 2002/0195936 A1 | * | 12/2002 | Kato et al. | 313/582 |

* cited by examiner

*Primary Examiner*—Frank G Font
*Assistant Examiner*—Jerry Blevins
(74) *Attorney, Agent, or Firm*—Melvin I. Stoltz

(57) ABSTRACT

A display device includes an edge-lit light-transmitting sheet having first and second opposed parallel surfaces. A matrix is applied to at least one of the first and second surfaces and comprises a series of lines extending between opposed edges of the sheet. The spacings between the lines and/or the thicknesses of the lines are so chosen as to obtain a desired intensity of illumination at selected areas of the sheet.

1 Claim, 5 Drawing Sheets

DISPLAY DEVICE

RELATED DATA

This application is a continuation of U.S. patent application Ser. No. 10/525,935 filed Oct. 25, 2005 now abandoned entitled DISPLAY DEVICE which is a 371 of PCT/GB03/03780 filed Aug. 28, 2003.

FIELD OF THE INVENTION

This invention relates to display devices of the kind that include an edge-lit light-transmitting sheet having first and second opposed parallel surfaces.

It is to be understood that the term "display device" includes an illuminated sign, such as is used for advertising and promotional purposes.

One form of display device of the above kind is described in European Patent Specification No. 0 549 679, which relates to a display device in which the first and second surfaces each have a matrix of etched, painted or screen-printed dots substantially covering said surfaces.

Another form of display device of the above kind is described in PCT Specification No. WO 00/58931, which relates to a display device in which at least one of the first and second surfaces has a matrix of spots each having a hollow transparent interior substantially covering at least a major portion of the surface to be illuminated.

With display devices of the above kind it is important that the presented surfaces of the device are illuminated substantially equally and, in particular, that the degree of illumination should not fall significantly at positions spaced from the source(s) of illumination.

Australian Patent Specification No. 683874 discloses an illuminated sign comprising a light-transmitting sheet and a light source adjacent an edge of the sheet, the sheet having opposed planar surfaces to at least one of which is applied a matrix comprising a pattern of lines with the thicknesses of the lines increasing with increased distance from the light source.

The pattern of lines comprises a series of adjacent rows of straight lines, with the lines extending at right angles to the edge of the sheet at which the light source is located.

It is an object of the present invention to provide an improved form of display device of the above kind.

SUMMARY OF THE INVENTION

According to the present invention there is provided an illuminated sign comprising a light-transmitting sheet and a light source adjacent an edge of the sheet, the sheet having opposed planar surfaces to at least one of which is applied a matrix comprising a pattern of lines with the thicknesses of the lines increasing with increased distance from the light source, characterised in that the pattern of lines comprises a plurality of intersecting hexagons that form a honeycomb pattern.

There may be either a single light source, or two light sources, one at each of two opposed edges of the sheet.

The light-transmitting sheet may be of an acrylic material, but other transparent materials, such as glass, may be employed. One other possible material is PETG, i.e. glycol-modified polyethylene terephthallate.

The preferred method of applying the markings is by inkjet printing. This produces a substantial reduction in respect of the quality control problems that have previously been encountered when making display devices of the above kind.

The markings may, however, be applied by means of a stencil, by means of a transfer, by laser printing or by engraving. Whichever means of applying the markings is chosen, a computer-controlled system may be used for choosing the thicknesses of the lines forming the hexagons and/or the sizes of the hexagons.

DESCRIPTION OF THE PREFERRED EMBODIMENTS

Figure 1:
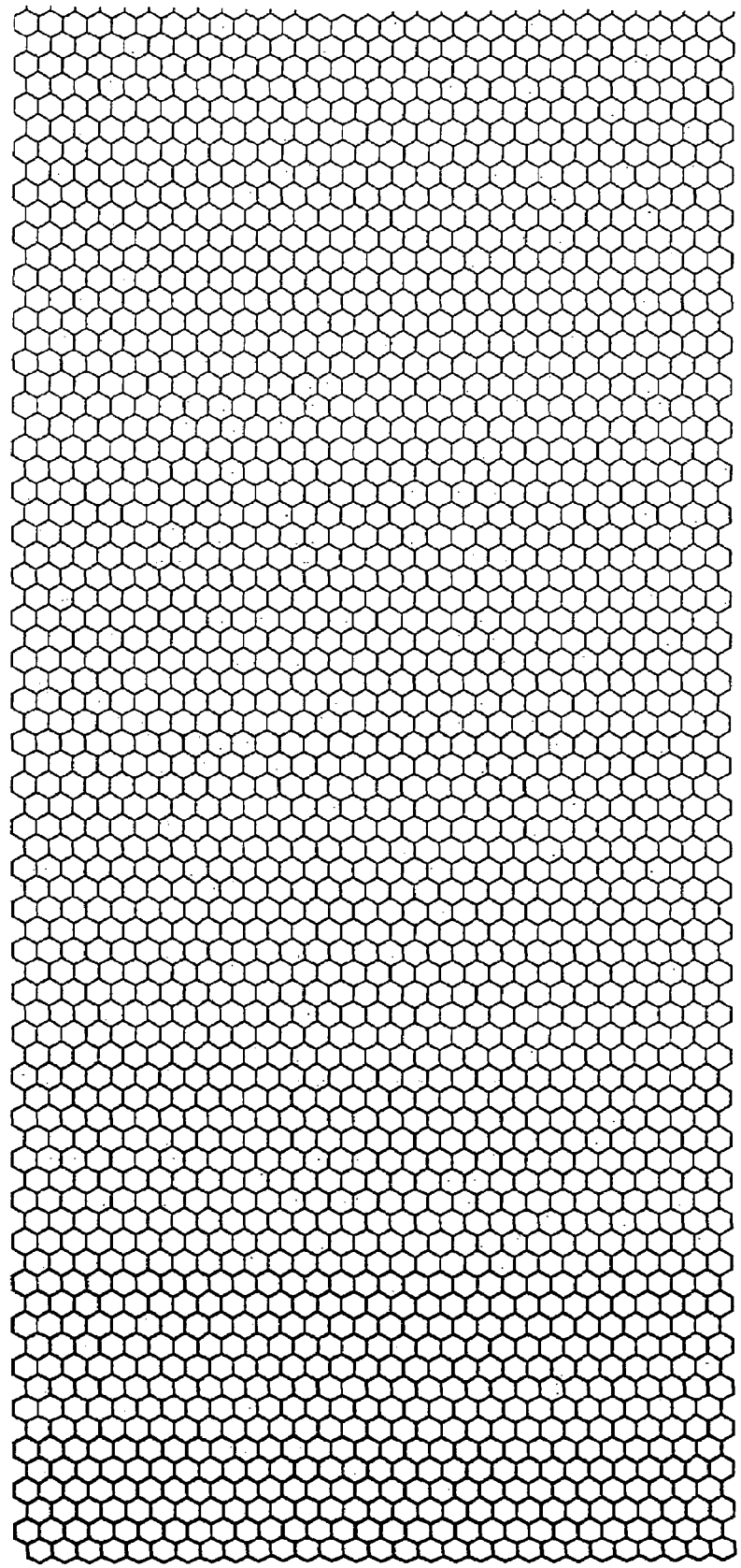
FIG. 1 of the drawings shows a hexagon pattern forming part of the surface of an illuminated sign, FIG. 2 of the drawings shows another hexagon pattern, FIG. 3 of the drawings is a graph comparing the degree of illumination of an illuminated sign having markings as shown in FIG. 1 with the degree of illumination of a known form of illuminated sign as referred to in the introduction to this specification.

FIG. 1 shows the matrix in accordance with the present invention that is applied to both sides of a rectangular sheet of clear acrylic resin. The matrix of FIG. 1 comprises a plurality of hexagons each of which has a maximum dimension of 4 mm. The thicknesses of the sides of the hexagons vary from one end of the matrix to the other, with the thickness increasing with increased distance from the light source. As viewed in FIG. 1, the light source will be at the top of the sheet and the thicknesses of the sides of the hexagons vary logarithmically from 0.3 pt to 1.77 pt.

If the illuminated sign or display device has light sources at both ends, then the thicknesses of the sides of the hexagons will increase from both ends of the rectangular sheet and will have maximum values at the centre of the sheet.

In addition to using hexagons that have sides of increasing thickness with increasing distance from the light source, it is possible to reduce the sizes of the hexagons with increasing distance from the light source.

Figure 2:
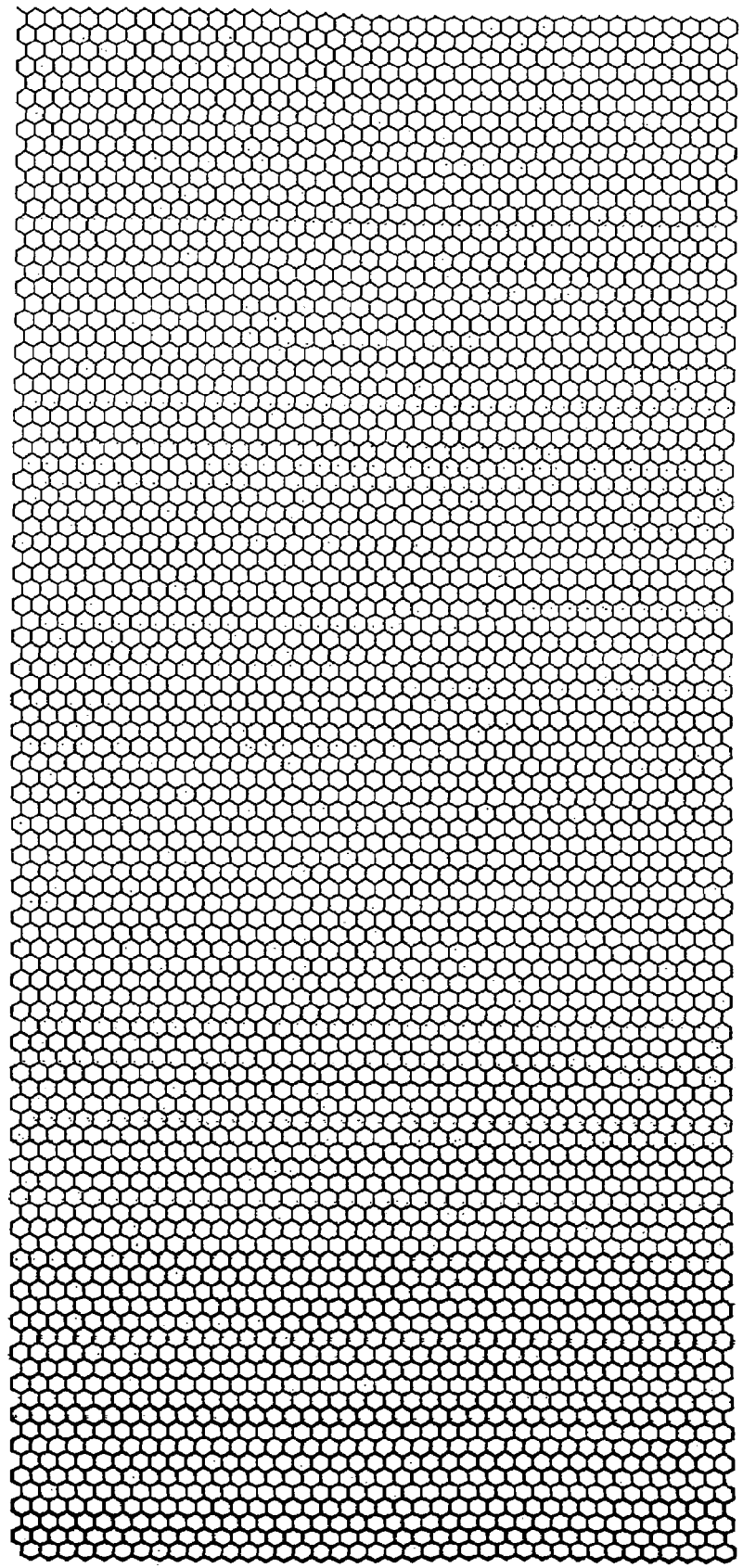

The matrix of FIG. 2 comprises a plurality of hexagons each of which has a maximum dimension of 3 mm. The thicknesses of the sides of the hexagons vary from one end of the matrix to the other, with the thickness increasing with increased distance from the light source. As viewed in FIG. 2, the light source will be at the top of the sheet and the thicknesses of the sides of the hexagons vary logarithmically from 0.3 pt to 1.9 pt.

It is to be appreciated that, if increased illumination is required in a particular area of a sign, for example, to highlight a specific part of an advertisement, the sides of the hexagons in that particular part of the matrix will be of increased thickness.

Figure 3:
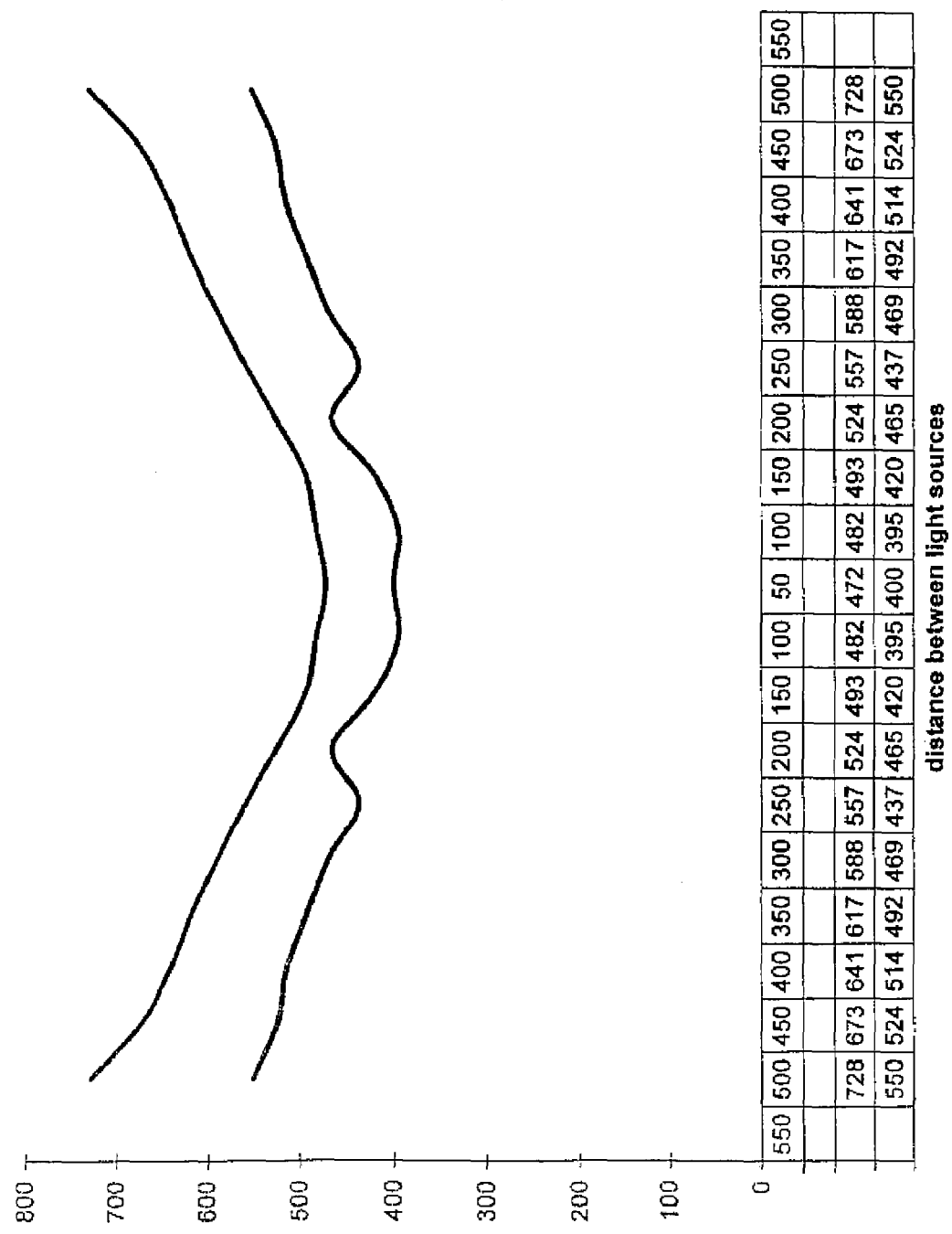

FIG. 3 gives comparative figures for results obtained with a display device or sign in accordance with the present invention and having an applied matrix as shown in FIG. 1 and with a sign produced as described in European Patent Specification No. 0 549 679. Each sign included an acrylic sheet having a thickness of 10 mm. and the upper line on the chart is that for the sign of the present invention.

As will be seen from FIG. 3, the degree of illumination obtained with the sign in accordance with the present invention is consistently superior to that obtained using a sign in accordance with European Patent Specification No. 0 549 679.

The markings can be applied to the light-transmitting sheet in any convenient way and may, for example, be in the form of a transfer that is bonded to the sheet. They may also be applied by, for example, inkjet printing and laser printing.

Figure 4:
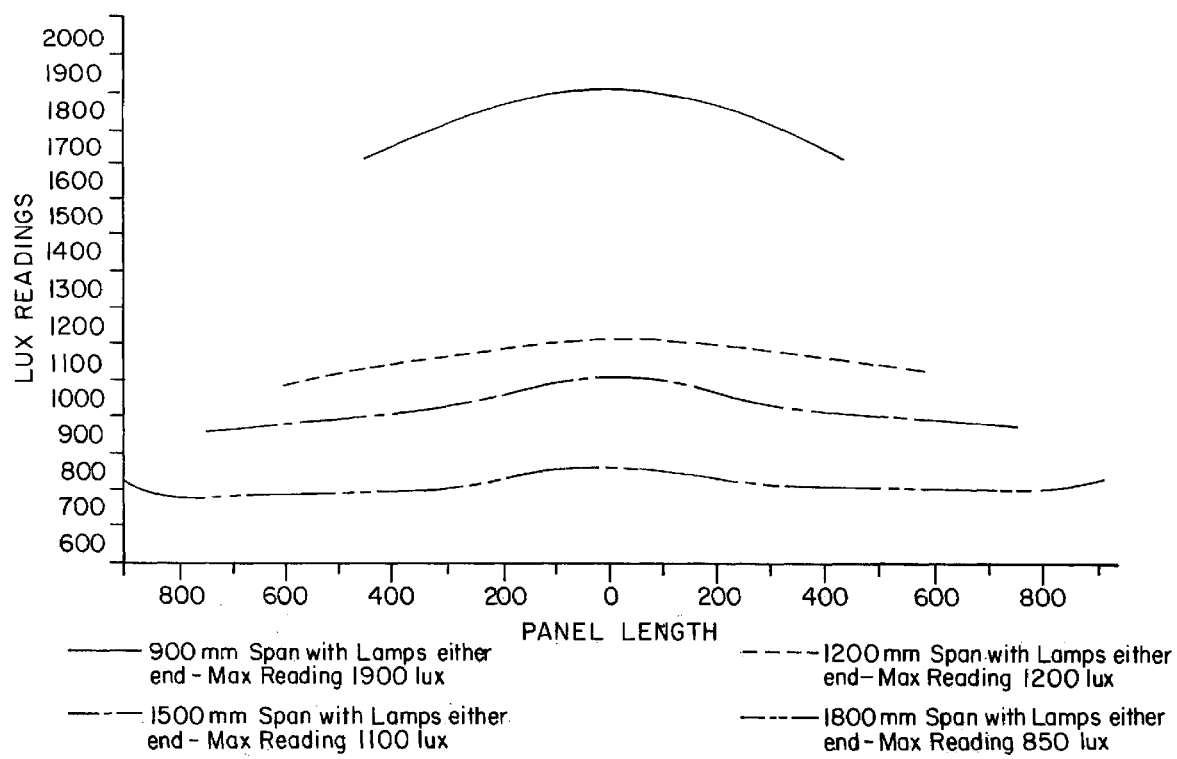
FIG. 4 shows levels of illumination obtained with fluorescent lamps placed against both ends of a rectangular sheet of acrylic resin to both sides of which a matrix has been applied.

FIG. 4 shows levels of illumination obtained with fluorescent laps placed against both ends of a rectangular sheet of acrylic resin and with a matrix of hexagons as shown in FIG. 1 extending from each end of the sheet, i.e. the sides of the hexagons are of maximum thickness at the centre of the sheet. In the particular example used to obtain the results shown in FIG. 4, the hexagons had maximum dimensions of 3.5 mm. Distances are measured from the centre of the sheet.

Figure 5:
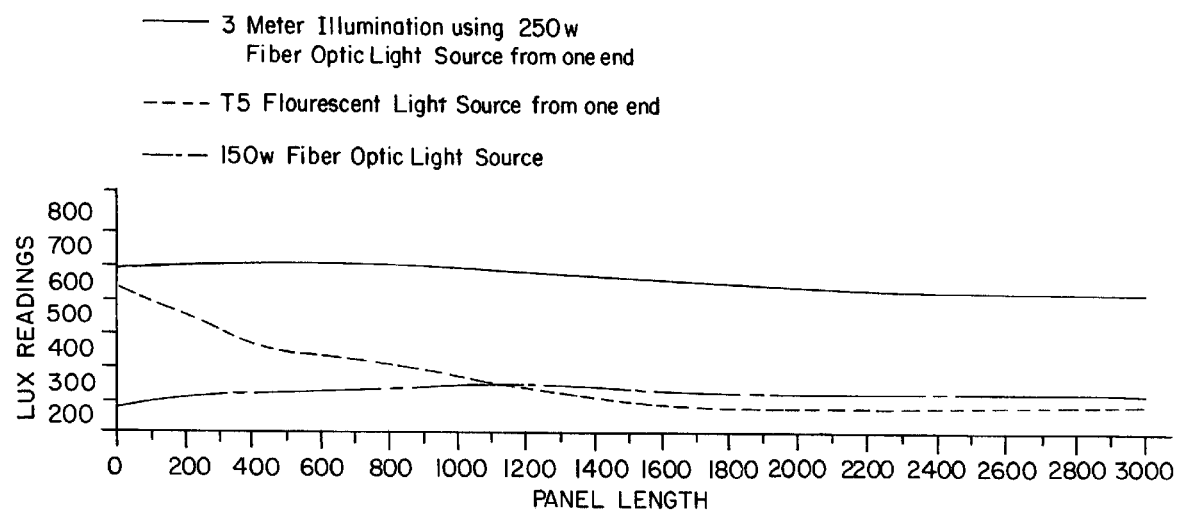
FIG. 5 shows levels of illumination obtained using different light sources.

FIG. 5 shows levels of illumination obtained using different light sources, i.e. a 250 w fibre optic light source, a 150 w fibre optic light source and a T5 fluorescent light source, each from one end of a rectangular sheet of acrylic resin having a length of 3 metres and with a matrix of hexagons having a maximum dimension of 4 mm. The rise in light output adjacent each of the fibre optic light sources is caused by the cones of light emitted by the fibre optic tails.

As will be seen, for a sign of this size illuminated from one end, optimum results were obtained using a 250 w fibre optic light source.

The invention claimed is:

1. An illuminated sign comprising a light-transmitting sheet having a pair of opposed edges and light sources adjacent said opposed edges, the sheet having opposed planar surfaces to at least one of which is applied a matrix comprising a pattern of lines that comprises a plurality of intersecting hexagons that form a honeycomb, and in which the thicknesses of the sides of the hexagon have maximum values at the centre of the sheet.

* * * * *